(Model.) 3 Sheets—Sheet 1.
S. H. STUPAKOFF.
PATTERN FOR RAILWAY FROGS.
No. 492,638. Patented Feb. 28, 1893.
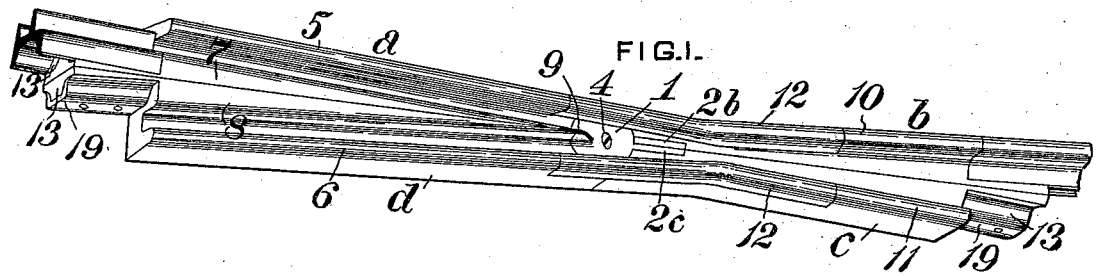
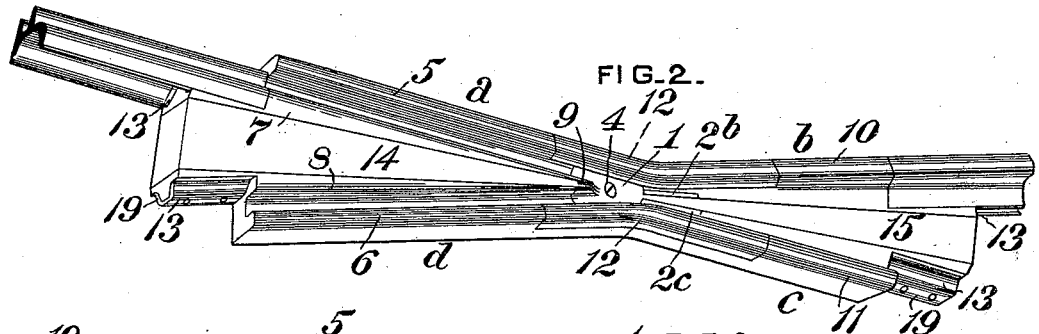
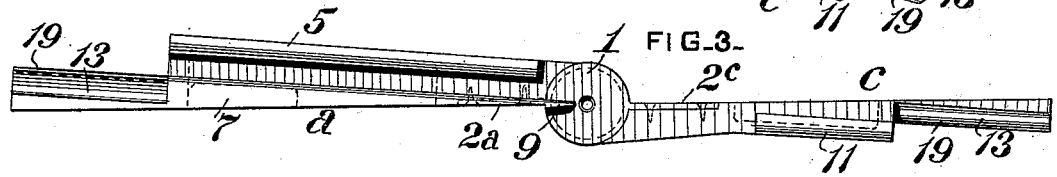
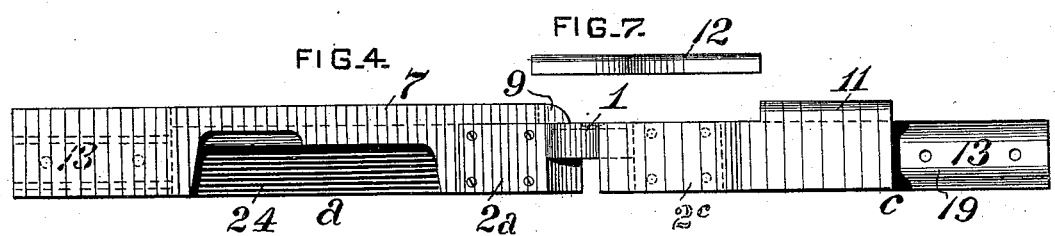
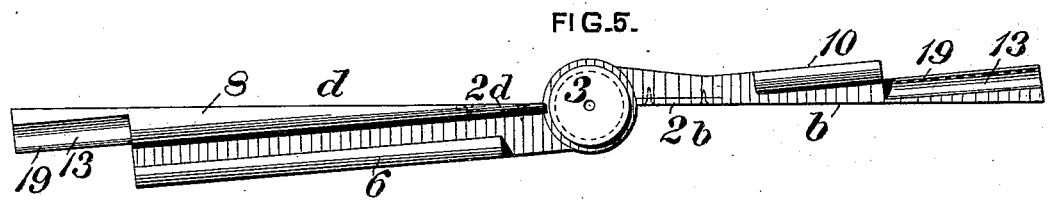
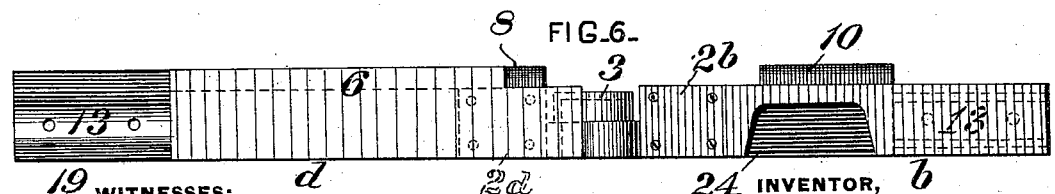
WITNESSES:
Darwin S. Wolcott
F. E. Gaither
INVENTOR,
Simon H. Stupakoff
by George H. Christy
Att'y.

(Model.) 3 Sheets—Sheet 2.
S. H. STUPAKOFF.
PATTERN FOR RAILWAY FROGS.
No. 492,638. Patented Feb. 28, 1893.
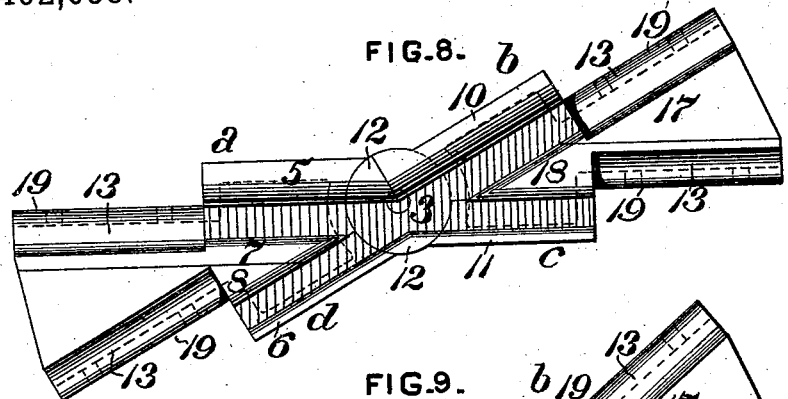
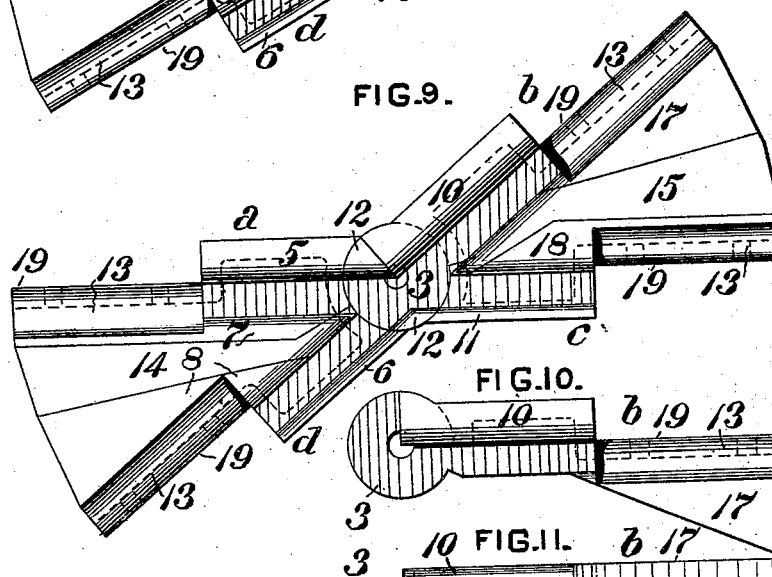
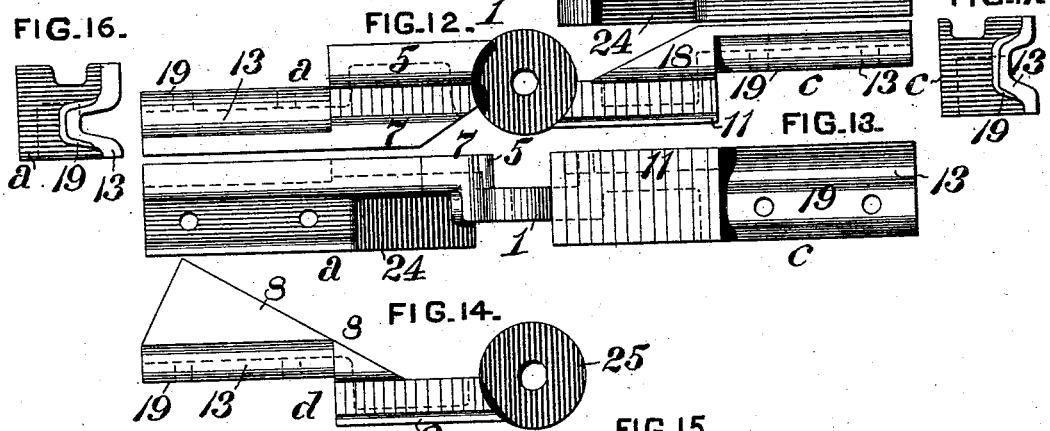
WITNESSES:
Danvin b. Wolcott
F. E. Gaither.
INVENTOR,
Simon H. Stupakoff
by George N. Christy
Att'y.

(Model.) 3 Sheets—Sheet 3.
S. H. STUPAKOFF.
PATTERN FOR RAILWAY FROGS.
No. 492,638. Patented Feb. 28, 1893.
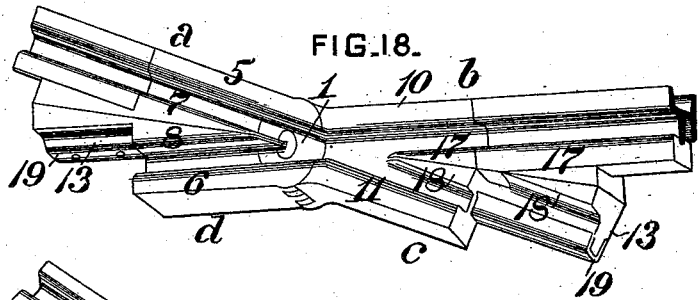
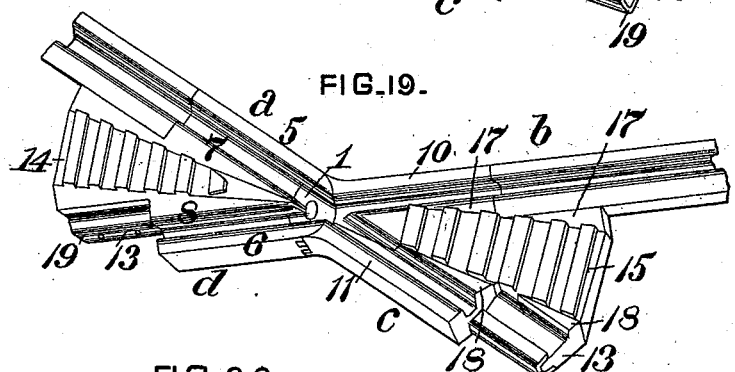
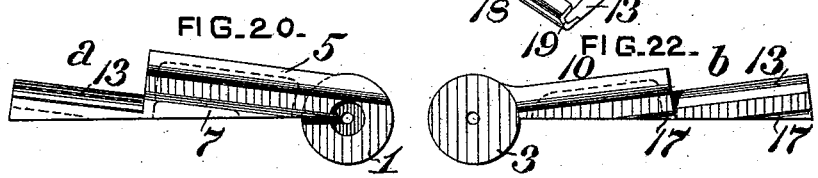
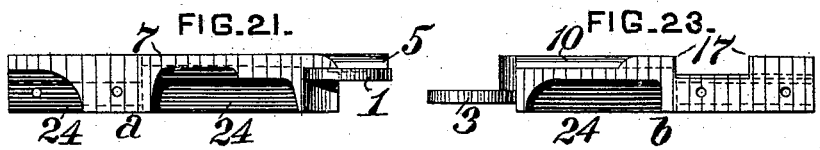
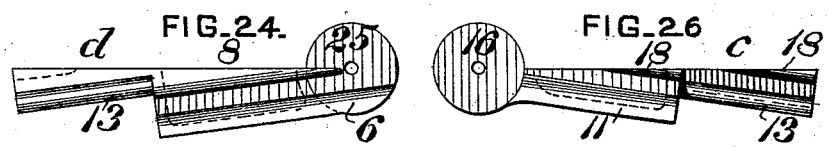
WITNESSES:
Darwin S. Wolcott
T. E. Gaither.
INVENTOR,
Simon H. Stupakoff
by George N. Christy
Att'y.

UNITED STATES PATENT OFFICE.

SIMON H. STUPAKOFF, OF PITTSBURG, PENNSYLVANIA, ASSIGNOR OF ONE-HALF TO EDWARD H. GOODMAN, OF SAME PLACE.

PATTERN FOR RAILWAY-FROGS.

SPECIFICATION forming part of Letters Patent No. 492,638, dated February 28, 1893.

Application filed July 26, 1892. Serial No. 441,257. (Model.)

*To all whom it may concern:*

Be it known that I, SIMON H. STUPAKOFF, a citizen of the United States, residing at Pittsburg, in the county of Allegheny and State of Pennsylvania, have invented or discovered certain new and useful Improvements in Patterns for Railway-Frogs, of which improvements the following is a specification.

The invention described herein relates to certain improvements in patterns for railway frogs. As is well known the angular arrangement of the arms of a frog, is dependent upon the angular divergence of a siding or crossover from the main line, or the angle formed by the tracks of two intersecting lines. Hence it has heretofore been customary in the manufacture of frogs to make a new pattern for each "spread" of frog ordered, and by the term "spread" is meant a difference in the angular divergence of the arms of a frog.

The object of the present invention is to provide a frog pattern having adjustable arms whereby the time and cost of making patterns for each new "spread" of frog may be avoided.

In general terms the invention consists in the construction and combination, substantially as hereinafter more fully described and claimed.

In the accompanying drawings forming a part of this specification, Figure 1 is a perspective view of my improved frog pattern, closed for small spread or angle frog. Fig. 2 is a similar view showing the frog open for the production of a larger size or angle frog. Figs. 3, 4, 5 and 6 are plan and side elevations of the two parts or members of the pattern. Fig. 7 is a detail view of one of the filling pieces. Figs. 8 and 9 are plan views of a pattern formed of three main parts or members. Figs. 10, 11, 12, 13, 14 and 15 are plans and side elevations of the main parts or members of the frog shown in Figs. 8 and 9. Figs. 16 and 17 are end views of the part shown in Figs. 12 and 13. Figs. 18 and 19 are perspective views of a further modification of my improved pattern, in a closed and open position. Figs. 20, 21, 22, 23, 24, 25, 26 and 27, are plan and side elevations of the main parts or members of the form of frog shown in Figs. 18 and 19, and Figs. 28, 29, 30 and 31, are side elevations and plans of the filling pieces employed when the arms of the frogs are opened.

In the practice of my invention, as shown in Figs. 1 to 6 inclusive, the arms $a$ and $c$ are secured to wings $2^a$ and $2^c$ projecting from diametrically opposite sides of a disk 1, while the arm $b$ and $d$ are secured to radial wings $2^b$ and $2^d$ of a disk 3. The disk 1 is made hollow on its under side for the reception of the disk 3, which is also made hollow so as to form a core in the mold, thereby reducing the weight of the finished frog. The disks are held in proper relation to each other by a pin 4. The wings are so arranged on the disks that when the pattern is adjusted for the smallest "spread" the wings $2^a$ and $2^b$ will be in contact or approximately so with the wings $2^d$ and $2^c$ respectively as shown in Fig. 1. The arms $a$ and $d$ are each constructed with raised ribs 5 and 6 along their outer edges, so shaped in cross-section as to form the guard rail of the frog. Along the inner edges of these parts $a$ and $d$ are formed ribs 7 and 8, so shaped in cross-section as to correspond when closed together as shown in Fig. 1 to the toe of the frog. The matrix for the end of the toe of the frog is formed by a projection 9 on the upper face of the disk 1, said projection preferably being a prolongation of the rib 7 on the arm $a$, but is made wider at its outer end than the rib, so that the inner end of the rib 8 on the arm $d$ will fit in behind it, as clearly shown in Fig. 1. The arms $b$ and $c$ are provided along their outer edges with ribs 10 and 11 constructed to form matrices for the stock rails of the frogs. As the ribs 5 and 6 on the arms $a$ and $d$ are at an angle to the ribs 10 and 11 on the arms $b$ and $c$, and as said angle will increase as the arms are opened out, said ribs do not extend the entire length of the arms, but the portions of ribs adjacent to the pivotal point of the arms, are formed by removable pieces 12. The longitudinal shape of these detachable rib pieces will change with each change in the angular adjustment of the arms, as will be clearly seen by reference to Figs. 1 and 2.

In order to provide for attaching the track rails to the frog, projections 13 are formed on the ends of the several arms for the formation of fish plates or blocks on the frog. The outer faces of these projections are suitably shaped so as to fit against the inner faces of the track rail, sections of which are shown attached to the pattern, although forming no part thereof. It is preferred to form core recesses 24 in the body of the arms, so that corresponding recesses will be formed in the finished frog thereby materially reducing the weight thereof.

When it is desired to make a larger size or angle frog, the rib pieces 12 are removed and the arms opened out to the required angle. New rib pieces 12 are then inserted, and the opening between the arms *a* and *d* is filled by a wedge shaped block 14, which is secured between said arms by screws or other suitable means, with its upper surface on a level with the upper surfaces of the ribs 7 and 8. The opening between the arms *b* and *c* is filled with a wedge shaped block 15, which is secured with its upper surface on a level with the upper surface of the body portion of said arms. As soon as these filling ribs and blocks are secured in place the pattern is ready for use.

It will be observed that although the arms *a*, *b*, *c* and *d* are described as separate and independent parts or entities, the parts *a* and *c* by reason of their attachment to the disk 1 form a single centrally pivoted arm, and that the parts *b* and *d* also by reason of the attachment to disk 3 form a single arm.

In Figs. 8 to 17 I have shown the pattern so constructed that two of the arms as *a c* move in unison with each other, being secured on diametrically opposite sides of the central or pivotal disk 1, while the arms *b* and *d* are independently adjustable, the arm *b* being attached to the pivotal disk 3, and the arm *d* to a third pivotal disk 25. The arms *a* and *d* are provided with ribs 5 and 6 along their outer edges for the formation of suitable matrices for the guard rails of the frog, and with ribs 7 and 8 along their inner edges for the formation of matrices for the toe of the frog. The arms *b* and *c* are formed with ribs 10 and 11 along their outer edges corresponding to the stock rails of the finished frog. The arms *b* and *c* may also be provided with ribs 17 and 18 along their inner edges for the formation of a matrix for a second guide point on the frog.

As shown in Figs. 8, 9, 10 and 11 the rib 10 on the arm *b* extends to the center of the disk 3, and the ribs 5, 6 and 11 on the arms *a*, *c* and *d*, extend to the peripheries of the pivotal disks, thus leaving gaps between the ends of the ribs 5, 6 and 10, 11, as clearly shown in Figs. 8 and 9. These gaps are filled by rib pieces 12, which in the three part pattern are triangular in shape. As the arms are adjusted away from each other the angle at the apex of these filling pieces will gradually decrease as will be seen by a comparison of the filling blocks in Figs. 8 and 9. The spaces between the arms when opened out are filled by blocks 14 and 15, the size of said blocks increasing with the angular divergence of the arms from each other.

As shown by reference to Figs. 11, 13 and 15, the pivotal disks are arranged at such heights on the arms, that when placed together the disk 1 is between the disks 3 and 25, the former being on top, each of the arms is provided at its outer end with a projection for formation of a fish plate or block on the arms of the frog for attaching the rails.

In Figs. 18 to 31, I have illustrated a construction of pattern, wherein the several arms are independently adjustable. In this construction the arm *a* is secured to or formed integral with the disk 1, the arm *b* with the disk 3, the arm *c* with the disk 16, and the arm *d* with the disk 25, as clearly shown in Figs. 20 to 27. The arms *a* and *d* (Figs. 20, 21, 24 and 25) are constructed as shown in Figs. 1 to 6 and hereinbefore described, except that the ribs 5 and 6 are extended over the pivotal disks, the rib 5 being formed integral with the disk 1, while the rib 6 is constructed to overlap and rest upon the disk 1, although the pivotal disk 25 is constructed to pass under the disk 1, when the several arms are fastened together. The arms *b c* (Figs. 22, 23, 26 and 27) are constructed as hereinbefore described and as shown in Figs. 1 to 6, with ribs 10 and 11 along their outer edges, except that said ribs extend to the periphery of the disks 3 and 16, as shown in Figs. 22 and 26. The adjacent ends of the ribs 5 and 10, and 6 and 11 are so constructed, as shown in Figs. 18 and 19, that they will turn on each other and remain in contact during the angular adjustments of the several arms.

The pivotal disks are so arranged as to their relative heights on the arms, that when placed together the disk 1 will be on top, the disk 25 immediately under the disk 1, then follow the disks 3 and 16 in the order named. These disks are preferably made of such thickness, that when placed together their united thickness will equal that of the body portions of the arms, and the disks are held together by the pivot pin 4.

When the arms are moved apart the spaces between them are filled by wedge shaped blocks 14 and 15, as hereinbefore described. But as the ribs 5, 6, 10 and 11 are extended in the construction shown in Figs. 18 to 27 until they abut, removable rib pieces 12 are not employed. The construction of the ribs 5, 6, 10 and 11, with their ends abutting may be embodied in the two part pattern shown in Figs. 1 to 6 if desired, and vice versa. These ribs in the four part pattern may be constructed as shown in Figs. 1 to 6, and the removable rib pieces employed when a change of adjustment of the arms is desired.

When the frogs are to be employed for street railway tracks, the upper faces of the filling blocks 14 and 15 may be roughened as shown in Figs. 19, 28, 29, 30 and 31.

If it is desired to make double pointed frogs, ribs 17 and 18 are formed along the inner edges of the arms *b* and *c*, as shown in Figs. 18, 19, 22, 23, 26 and 27, but as this second point forms only a guide at the heel of the frog, the apex of the point does not extend up to the throat of the frog as shown in Figs. 18 and 19. The ends of the arms are provided with projections 13 for attaching rails to the frogs, as hereinbefore described.

It will be understood that various changes such as the omission of the ribs for forming the guard rails, alteration in the shapes of the ribs for forming the toe of the frog, and other alterations in the specific construction of the arms and their manner of connecting them together to form a unitary pattern, may be made, without departing from the main characteristic of my invention, which is the provision of adjustable arms, whereby the same pattern may be employed in the manufacture of frogs of different spread or angle, without regard to specific details of construction.

The projections 13 are provided with removable blocks or plates 19, so that the faces of these projections may be made to correspond to the contour of the rails of the track in which the frog is to be placed.

The two part pattern shown in Figs. 1 to 6 is designed for the manufacture of frogs for the crossing of two straight lines of track, where there is no lateral divergence of the rails. The three part pattern shown in Figs. 8 to 15 inclusive is adapted for the manufacture of frogs for the crossing of straight and curved lines of track, the independent adjustability of the arms *b* and *d* permitting of said arms being set at a slight angle to each other corresponding approximately to the curvature of the line of rails in which the arms are included. While the four part pattern shown in Figs. 18 to 27, is adapted for the production of frogs for the crossing of two curved lines of track. Each of the arms being independently adjustable, the arms *a* and *c* can be set at a slight angle to each other for one line of rails of one track and the arms *b d* can be similarly adjusted for a line of rails of the other track. It will be understood that the three part pattern can be employed in the manufacture of frogs for the crossing of two straight lines of track, and that the four part pattern can be employed for the production of frogs for the crossing of two straight or of straight and curved lines of track.

I claim herein as my invention—

1. A pattern for railway frogs having two or more of its arms angularly adjustable with relation to the other arms, whereby one pattern is adapted to be used in the manufacture of frogs having different angular arrangement of arms, substantially as set forth.

2. A pattern for railway frogs having two or more of its arms pivoted around a common center, thereby permitting of the adjustment of the pattern for the manufacture of frogs having different angular arrangement of arms, substantially as set forth.

3. In a railway frog pattern, the combination of a series of two or more arms angularly adjustable with relation to each other and removable blocks for filling the spaces between the arms, substantially as set forth.

4. In a railway frog pattern, the combination of a series of two or more arms angularly adjustable with relation to each other, said arms being provided with suitable ribs along portions of their outer edges, and removable and interchangeable rib pieces for filling the spaces between adjacent ends of the ribs on the arms, substantially as set forth.

5. A railway frog pattern having two or more of its arms angularly adjustable with relation to its other arms, in combination with removable and interchangeable plates for the formation of fish plates or rail supports on the frog, substantially as set forth.

In testimony whereof I have hereunto set my hand.

SIMON H. STUPAKOFF.

Witnesses:
DARWIN S. WOLCOTT,
R. H. WHITTLESEY.